US012625060B2

(12) United States Patent
Liu et al.

(10) Patent No.: US 12,625,060 B2
(45) Date of Patent: May 12, 2026

(54) ENVIRONMENTAL TEST EQUIPMENT FOR COOPERATIVE CONTROL OF SALT SPRAY CONCENTRATION AND RELATIVE HUMIDITY

(71) Applicant: CHINA NATIONAL ELECTRIC APPARATUS RESEARCH INSTITUTE CO., LTD., Guangdong (CN)

(72) Inventors: Miaoran Liu, Guangdong (CN); Chuan Chen, Guangdong (CN); Jun Wang, Guangdong (CN); Shouhe Wang, Guangdong (CN); Yang Wang, Guangdong (CN); Haoran Liu, Guangdong (CN); Li Xiang, Guangdong (CN); Xiaoyi Shi, Guangdong (CN)

(73) Assignee: CHINA NATIONAL ELECTRIC APPARATUS RESEARCH INSTITUTE CO., LTD., Guangdong (CN)

( * ) Notice: Subject to any disclaimer, the term of this patent is extended or adjusted under 35 U.S.C. 154(b) by 248 days.

(21) Appl. No.: 18/690,745

(22) PCT Filed: Nov. 19, 2021

(86) PCT No.: PCT/CN2021/131811
§ 371 (c)(1),
(2) Date: Mar. 11, 2024

(87) PCT Pub. No.: WO2023/035410
PCT Pub. Date: Mar. 16, 2023

(65) Prior Publication Data
US 2024/0393230 A1      Nov. 28, 2024

(30) Foreign Application Priority Data
Sep. 13, 2021   (CN) .......................... 202111071265.7

(51) Int. Cl.
| | | |
|---|---|---|
| *G01N 17/00* | (2006.01) | |
| *G05D 21/02* | (2006.01) | |
| *G05D 27/02* | (2006.01) | |

(52) U.S. Cl.
CPC ........... *G01N 17/002* (2013.01); *G05D 21/02* (2013.01); *G05D 27/02* (2013.01)

(58) Field of Classification Search
CPC ....... G01N 17/002; G05D 21/02; G05D 27/02
See application file for complete search history.

(56) References Cited

FOREIGN PATENT DOCUMENTS

| | | |
|---|---|---|
| CN | 102778428 | 11/2012 |
| CN | 203869997 | 10/2014 |

(Continued)

OTHER PUBLICATIONS

"International Search Report (Form PCT/ISA/210) of PCT/CN2021/131811," mailed on Jun. 16, 2022, with English translation thereof, pp. 1-4.

*Primary Examiner* — Jonathan M Dunlap
(74) *Attorney, Agent, or Firm* — JCIP GLOBAL INC.

(57) ABSTRACT

Environmental test equipment for the cooperative control of salt spray concentration and relative humidity, comprising: a dry salt spray generation system, an air conditioning system, a mixing chamber, a test chamber and an electric control cabinet; in accordance with the principle of conserving salt content and moisture content before and after mixing, the environmental test equipment obtains a salt spray concentration relationship formula and a relative humidity relationship formula between: environmental parameters in the test chamber, dry salt spray environmental parameters in the dry salt spray generation system, and air conditioning environmental parameters in the air conditioning system; after determining environmental test parameters required in the test chamber, the salt spray concentration (Continued)

relationship formula and the relative humidity relationship formula are used to obtain: temperature parameters and relative humidity parameters required to be set in the dry salt spray generation system, and temperature parameters and relative humidity parameters required to be set in the air conditioning system.

9 Claims, 1 Drawing Sheet

(56)                    References Cited

FOREIGN PATENT DOCUMENTS

| | | |
|---|---|---|
| CN | 208313780 | 1/2019 |
| CN | 110108612 | 8/2019 |
| CN | 113515157 | 10/2021 |
| WO | 2014091660 | 6/2014 |

ENVIRONMENTAL TEST EQUIPMENT FOR COOPERATIVE CONTROL OF SALT SPRAY CONCENTRATION AND RELATIVE HUMIDITY

CROSS-REFERENCE TO RELATED APPLICATION

This application is a 371 application of International PCT application serial no. PCT/CN2021/131811 filed on Nov. 19, 2021, which claims the priority benefit of China application no. 202111071265.7 filed on Sep. 13, 2021. The entirety of each of the above mentioned patent applications is hereby incorporated by reference herein and made a part of this specification.

BACKGROUND

Technical Field

This disclosure relates to the environmental test equipment for cooperative control of salt spray concentration and relative humidity.

Description of Related Art

Salt spray test is a commonly used method for evaluating the corrosion resistance of metal materials. The current salt spray chamber for conducting salt spray test uses compressed air to break the solution into a fine spray and pass it into the test chamber. The generated salt spray has the characteristics of high concentration and high relative humidity, which make a fast acceleration effect on metal materials. When conducting environmental adaptability research on electrical equipment with salt spray test, the existing test equipment and methods have a rapid acceleration effect, causing serious corrosion of different components in the electrical equipment, leading to the failure of the electrical equipment. However, it is impossible to reproduce the different types of faults that may occur in the actual use of the electrical equipment.

Furthermore, the existing salt spray chambers have high relative humidity during salt spray test, and salt spray and humidity cannot be cooperative controlled, resulting in significant differences from the actual service environment of the tested equipment. Therefore, using the salt spray test results obtained from the existing salt spray chambers to evaluate the environmental adaptability of the equipment may lose its reference significance.

SUMMARY

An object of the present disclosure is to provide an environmental test equipment for cooperative control of salt spray concentration and relative humidity, which can achieve cooperative control of salt spray concentration and relative humidity, allowing the salt spray chamber to simulate the actual service environment of the tested equipment and simulate appropriate and scientific acceleration factors associated with the actual service environment, reproducing possible fault problems that may occur during the service process of the tested equipment.

The technical solution of the present disclosure is as follows.

An environmental test equipment for cooperative control of salt spray concentration and relative humidity, comprising a dry salt spray generation system, an air conditioning system, a mixing chamber, a test chamber, and an electrical control cabinet, the dry salt spray generation system is a first chamber comprising a dry spray generator, a first temperature regulation module, and a first humidity regulation module, the dry spray generator grinds salt particles into micron sized dry salt aerosol particles, and adjusts the dry salt spray generation system to a set temperature and relative humidity through the first temperature regulation module and the first humidity regulation module, then the dry salt aerosol particles are introduced into the mixing chamber; the air conditioning system is a second chamber comprising a second temperature regulation module and a second humidity regulation module, used to regulate the air inside the air conditioning system to the set temperature and relative humidity, and then air is introduced into the mixing chamber; the mixing chamber is used to mix the dry salt aerosol particles inside and the introduced regulated air evenly, and then introduce them into the test chamber; the test chamber is used for conducting environmental tests, and is equipped with sensors to monitor the salt spray concentration, the relative humidity, and a temperature; the electric control cabinet is used to control an operation of devices in the dry salt spray generation system, the air conditioning system, the mixing chamber, and the test chamber.

Based on a principle of conservation of salt and moisture content before and after the mixing, the environmental test equipment obtains a salt spray concentration relationship and a relative humidity relationship among environmental parameters in the test chamber, dry salt spray environmental parameters in the dry salt spray generation system, and the environmental parameters of the regulated air in the air conditioning system; after determining the environmental test parameters required for the test chamber, obtaining the temperature and relative humidity parameters required for the dry salt spray generation system, as well as the temperature and relative humidity parameters required for the air conditioning system, through the salt spray concentration relationship and the relative humidity relationship.

The present disclosure also has the following preferred solutions.

The dry salt spray generation system is connected to the mixing chamber through a first air supply device with adjustable flow rate, the air conditioning system is connected to the mixing chamber through a second air supply device with adjustable flow rate, and the mixing chamber is connected to the test chamber through a third air supply device with adjustable flow rate.

The dry spray generator comprises a connected salt inlet pipe and a grinding chamber. A grinding knife driven by a servo motor is installed in the grinding chamber, and the grinding chamber is equipped with an outlet connected to the first chamber of the dry salt spray generation system, at which a filter screen and a fourth air supply device with adjustable flow rate are installed, and the dry salt aerosol particles formed by grinding are introduced into the first chamber of the dry salt spray generation system through the fourth air supply device.

The first to fourth air supply devices of the present disclosure can be equipped with automatic switches and flow adjustment components to achieve automatic control of switches and flow. The dry salt spray generation system can adjust the salt spray concentration by controlling the amount of salt particles added and the power of the grinding knife controlled by a servo motor.

A gas flow rate from the mixing chamber to the test chamber as described in the present disclosure is equal to a flow rate from the dry salt spray generation system to the mixing chamber plus a flow rate from the air conditioning system to the mixing chamber, to maintain a pressure inside the mixing chamber.

The test chamber of the present disclosure is equipped with an exhaust device to maintain a pressure inside the test chamber.

The set temperature in the dry salt spray generation system and the set temperature in the air conditioning system are both a required test environment temperature in the test chamber. Therefore, after a temperature in the dry salt spray generation system and a temperature in the air conditioning system both reach the set temperature, the dry salt aerosol particles and the regulated air are introduced into the mixing chamber.

As a feasible embodiment of the present disclosure, the salt spray concentration relationship and the relative humidity relationship among the environmental parameters in the test chamber, the dry salt spray environmental parameters in the dry salt spray generation system, and the environmental parameters of the regulated air in the air conditioning system are as follows.

$$C = \frac{C_1 V_1}{V_1 + V_2} \tag{1}$$

$$RH = \frac{(V_1 S_1 RH_1 + V_2 S_2 RH_2) + V_1 C_1 (\omega_2 - \omega_1)/\omega_1 \omega_2}{(V_1 + V_2)S} \tag{2}$$

Wherein, C is the salt spray concentration that needs to be controlled in the test chamber; $C_1$ is a NaCl concentration in the dry salt spray atmosphere before mixing, having a unit of $g/m^3$; $V_1$ is a volume of the dry salt spray atmosphere before the mixing; $V_2$ is a volume of the regulated air before the mixing; RH is a relative humidity after the mixing; $S_1$ is a saturated absolute humidity of the dry salt spray atmosphere before the mixing, which is related to temperature and is measured in a unit of $g/m^3$; $S_2$ is a saturated absolute humidity of the regulated air before the mixing, which is related to the temperature and is measured in a unit of $g/m^3$; $RH_1$ is a relative humidity of the dry salt spray atmosphere before the mixing; $RH_2$ is a relative humidity of the regulated air before the mixing; $\omega_1$ is a mass fraction of NaCl in NaCl droplets in the dry salt spray atmosphere before the mixing; $\omega_2$ is a mass fraction of NaCl in NaCl droplets in the salt spray atmosphere after the mixing; S is a saturated absolute humidity of the mixed air after the mixing, which is related to the temperature and is measured in a unit of $g/m^3$.

Furthermore, the salt spray concentration monitoring values obtained in the test chamber by a salt spray laser monitoring sensor are compared with theoretical values of the salt spray concentration calculated through the salt spray concentration relationship, and a correction coefficient $\alpha$ is obtained based on a ratio of the salt spray concentration monitoring values to the theoretical values of the salt spray concentration, and then obtain the following correction relationship for maintaining the salt spray concentration in the test chamber as described below, $$C = \alpha \frac{C_1 V_1}{V_1 + V_2}. \tag{3}$$

Then, combined with the relative humidity relationship $$RH = \frac{(V_1 S_1 RH_1 + V_2 S_2 RH_2) + V_1 C_1 (\omega_2 - \omega_1)/\omega_1 \omega_2}{(V_1 + V_2)S}, \tag{2}$$

adjust the relative humidity of the air conditioning system and the air flow rate entering the mixing chamber to achieve dynamic equilibrium between the salt spray concentration and the relative humidity in the test chamber.

During the adjustment process of dynamic equilibrium between the salt spray concentration and the relative humidity in the test chamber, keep a concentration and a relative humidity of the dry salt spray atmosphere entering the mixing chamber constant, and adjust the ratio of the flow rate from the dry salt spray generation system to the mixing chamber and the flow rate from the air conditioning system to the mixing chamber, as well as the relative humidity of the air, to obtain the required testing environment parameters for the test chamber.

This disclosure has the following advantages.

1. This disclosure solves the problem of the inability of existing salt spray test equipment to cooperatively control salt spray concentration and relative humidity, making the environment inside the test chamber closer to the actual environmental characteristics. At the same time, this disclosure control the severity of the simulated environment inside the test box, obtain an appropriate acceleration factor, reproduce possible fault problems that may occur during the service of electrical equipment, in order to meet the requirements of environmental adaptability test for electrical equipment.

2. This disclosure takes into account the certain losses that may occur during the propagation of salt spray, resulting in deviations between the actual environment of the test chamber and the theoretical calculation values. By comparing and analyzing the salt spray concentration values monitored by sensors in the test chamber with the theoretical values, a correction coefficient is obtained based on the ratio of the two. The correction coefficient is added to the correlation relationship of the dry salt spray, the regulated air, and mixed air parameters for correction. Furthermore, by controlling relevant parameters through the new correlation relationship, achieve the required environmental characteristics in the test chamber, and achieve dynamic equilibrium of the test chamber environment.

3. The control method of this disclosure is simple and easy to achieve automation. Controlling the concentration and relative humidity of the dry salt spray atmosphere to remain unchanged, the environmental parameters required for the test chamber be obtained only by controlling the relative humidity of the regulated air and the flow rate ratio between the regulated air and the dry salt spray atmosphere.

The reference numbers shown in the figures are stated below.

1—dry salt spray generation system, 2—air conditioning system, 3—mixing chamber, 4—test chamber, 51—first temperature regulation module, 52—second temperature regulation module, 61—first humidity regulation module, 62—second humidity regulation module, 7—salt spray laser monitoring sensor, 8—electric control cabinet, 9—air supply device, 91—first air supply device, 92—second air supply device, 93—third air supply device, 94—fourth air supply device, 10—dry spray generator, 11—salt inlet pipe, 12—grinding knife, 13—servo motor, 14—filter screen.

DESCRIPTION OF THE EMBODIMENTS

The following will provide a detailed explanation of the technical solution of the disclosure in conjunction with the accompanying figures and embodiments, in order for those skilled in the art to better understand and implement the technical solution of the disclosure.

Figure 1:
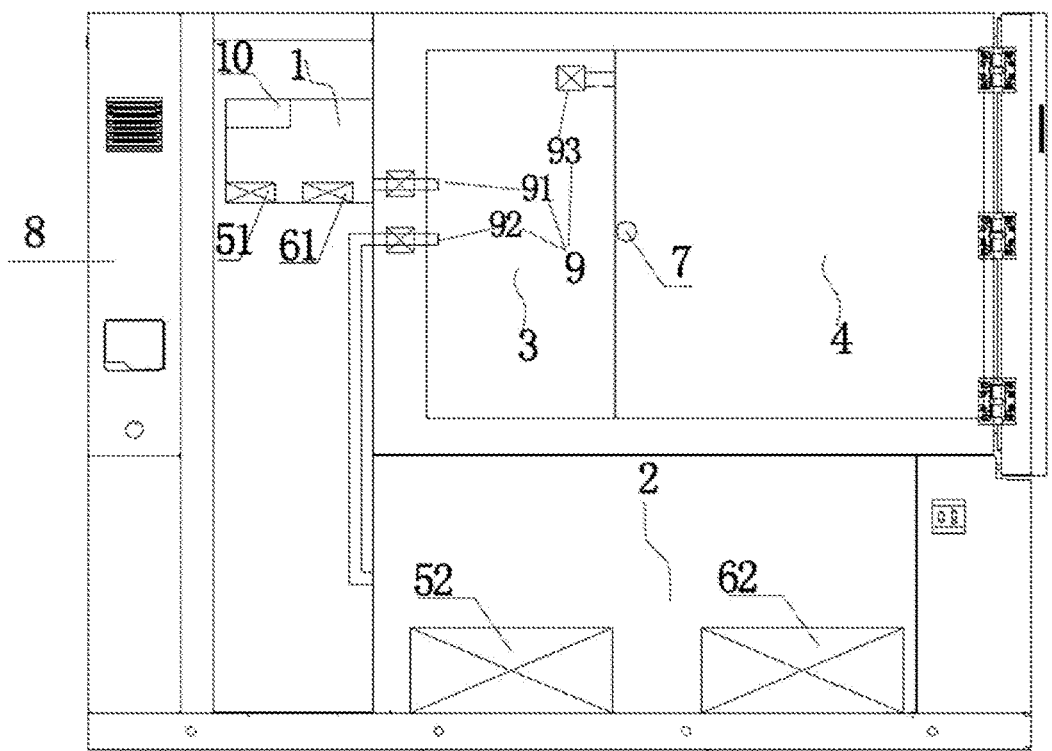
FIG. 1 is a working principle diagram of the environmental test equipment for cooperative control of salt spray concentration and relative humidity according to the disclosure.
Figure 2:
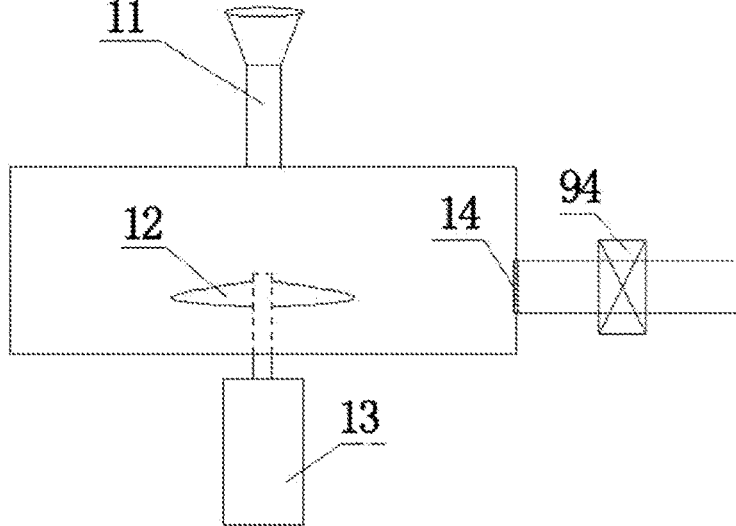
FIG. 2 is the schematic diagram of a dry spray generator in FIG. 1.

As shown in FIGS. 1-2, an environmental test equipment for cooperative control of salt spray concentration and relative humidity, comprising a dry salt spray generation system 1, an air conditioning system 2, a mixing chamber 3, a test chamber 4, and an electrical control cabinet 8. The dry salt spray generation system 1 is a first chamber comprising a dry spray generator 10, a first temperature regulation module 51, and a first humidity regulation module 61. The dry spray generator 10 grinds salt particles into micron sized dry salt aerosol particles, and adjusts the dry salt spray generation system to the set temperature and relative humidity through the first temperature regulation module 51 and the first humidity regulation module 61, then the dry salt aerosol particles are introduced into the mixing chamber 3. The air conditioning system 2 is a second chamber comprising a second temperature regulation module 52 and a second humidity regulation module 62, used to regulate the air inside the air conditioning system 2 to the set temperature and relative humidity, and then the air is introduced into the mixing chamber 3. The mixing chamber 3 is used to mix the dry salt aerosol particles inside and the introduced regulated air evenly, and then introduce them into the test chamber 4. The test chamber 4 is used for conducting environmental tests, and is equipped with sensors to monitor salt spray concentration, relative humidity, and temperature, including a salt spray laser monitoring sensor 7 and temperature and humidity sensors. The electric control cabinet 8 is used to control the operation of the devices in the dry salt spray generation system 1, the air conditioning system 2, the mixing chamber 3, and the test chamber 4.

Based on the principle of conservation of salt and moisture content before and after mixing, the environmental test equipment obtains the salt spray concentration relationship and relative humidity relationship among the environmental parameters in the test chamber 4, the dry salt spray environmental parameters in the dry salt spray generation system 1, and the environmental parameters of the regulated air in the air conditioning system 2. After determining the environmental test parameters required for the test chamber 4, obtain the temperature and relative humidity parameters required for the dry salt spray generation system 1, as well as the temperature and relative humidity parameters required for the air conditioning system 2, through the salt spray concentration relationship and relative humidity relationship.

The following are preferred embodiments.

The dry salt spray generation system 1 is connected to the mixing chamber 3 through a first air supply device 91 with adjustable flow rate, the air conditioning system 2 is connected to the mixing chamber 3 through a second air supply device 92 with adjustable flow rate, and the mixing chamber 3 is connected to the test chamber 4 through a third air supply device 93 with adjustable flow rate.

As shown in FIG. 2, the dry spray generator 10 comprises a connected salt inlet pipe 11 and a grinding chamber. A grinding knife 12 driven by a servo motor 13 is installed in the grinding chamber, and the grinding chamber is equipped with an outlet connected to the first chamber of the dry salt spray generation system 1, at which a filter screen 14 and a fourth air supply device 94 with adjustable flow rate are installed. The dry salt aerosol particles formed by grinding are introduced into the first chamber of the dry salt spray generation system 1 through the fourth air supply device 94.

The first to fourth air supply devices are air supply devices 9 of the same structural type, which can be equipped with automatic switches and flow adjustment components to achieve automatic control of switches and flow. The dry salt spray generation system 1 can adjust the salt spray concentration by controlling the amount of salt particles added and the power of the grinding knife 12 controlled by the servo motor 13.

The gas flow rate from the mixing chamber 3 to the test chamber 4 is equal to the flow rate from the dry salt spray generation system 1 to the mixing chamber 3 plus the flow rate from the air conditioning system 2 to the mixing chamber 3, to maintain the pressure inside the mixing chamber 3.

The test chamber 4 is equipped with an exhaust device to maintain the pressure inside the test chamber 4.

The set temperature in the dry salt spray generation system 1 and the set temperature in the air conditioning system 2 are both the required test environment temperature in the test chamber 4. Therefore, after the temperature in the dry salt spray generation system 1 and the temperature in the air conditioning system 2 reach the set temperature, the dry salt aerosol particles and the regulated air are introduced into the mixing chamber 3.

The salt spray concentration relationship and relative humidity relationship among the environmental parameters in the test chamber 4, the dry salt spray environmental parameters in the dry salt spray generation system 1, and the environmental parameters of the regulated the air in the air conditioning system 2 are as follows.

$$C = \frac{C_1 V_1}{V_1 + V_2} \qquad (1)$$

$$RH = \frac{(V_1 S_1 RH_1 + V_2 S_2 RH_2) + V_1 C_1 (\omega_2 - \omega_1)/\omega_1 \omega_2}{(V_1 + V_2)S} \qquad (2)$$

Wherein, C is the salt spray concentration that needs to be controlled in the test chamber; $C_1$ is the NaCl concentration in the dry salt spray atmosphere before mixing, having a unit of $g/m^3$; $V_1$ is the volume of the dry salt spray atmosphere before mixing; $V_2$ is the volume of the regulated air before mixing; RH is the relative humidity after mixing; $S_1$ is the saturated absolute humidity of the dry salt spray atmosphere before mixing, which is related to temperature and is measured in a unit of $g/m^3$; $S_2$ is the saturated absolute humidity of the regulated air before mixing, which is related to the temperature and is measured in a unit of $g/m^3$; $RH_1$ is the relative humidity of the dry salt spray atmosphere before mixing; $RH_2$ is the relative humidity of the regulated air before mixing; $\omega_1$ is the mass fraction of NaCl in NaCl droplets in the dry salt spray atmosphere before mixing; $\omega_2$ is the mass fraction of NaCl in NaCl droplets in the salt spray atmosphere after mixing; S is the saturated absolute humidity of the mixed air after mixing, which is related to the temperature and is measured in a unit of g/m³.

Considering that the salt spray may experience certain losses during its propagation, which results in deviations between the actual environment of the test chamber 4 and the theoretical calculation values, the salt spray concentration monitoring values obtained by the salt spray laser monitoring sensor 7 in the test chamber 4 are compared with the theoretical values of the salt spray concentration calculated through the salt spray concentration relationship, and a correction coefficient α is obtained based on the ratio of the salt spray concentration monitoring values to the theoretical values of the salt spray concentration, and then obtain the following correction relationship for maintaining the salt spray concentration in the test chamber 4 as described below.

$$C = \alpha \frac{C_1 V_1}{V_1 + V_2} \quad (3)$$

Then, combined with the relative humidity relationship $$RH = \frac{(V_1 S_1 RH_1 + V_2 S_2 RH_2) + V_1 C_1 (\omega_2 - \omega_1)/\omega_1 \omega_2}{(V_1 + V_2)S}, \quad (2)$$

adjust the relative humidity of the air conditioning system and the air flow rate entering the mixing chamber to achieve dynamic equilibrium between the salt spray concentration and relative humidity in the test chamber.

During the adjustment process of dynamic equilibrium between salt spray concentration and relative humidity in the test chamber 4, keep the concentration and relative humidity of the dry salt spray atmosphere entering the mixing chamber 3 constant, and adjust the ratio of the flow rate from the dry salt spray generation system 1 to the mixing chamber 3 and the flow rate from the air conditioning system 2 to the mixing chamber 3, to obtain the required testing environment parameters for the test chamber 4.

Embodiment 1

During the operation of environmental test equipment, the fixed dry salt spray concentration is 3000 mg/m³ and the relative humidity is 40%. Set the environmental parameters required for test chamber, wherein temperature is 35° C., relative humidity is 80%, and salt spray concentration is 500 mg/m³. By using formulas 1 and 2, it can be calculated that the relative humidity of the regulated air should be set to 88%, and the ratio of the dry salt spray atmosphere to regulated air volume should be 1:5. When starting the environmental test equipment, the equipment firstly uses the dry salt spray generation system 1 to generate a fixed concentration of 4000 mg/m³ of dry salt spray atmosphere. In the dry salt spray generation system 1, the temperature is controlled to 35° C. by the first temperature regulation module 51, and the relative humidity is adjusted to 40% by the first humidity regulation module 61. Simultaneously, use the second temperature regulation module 52 of air conditioning system 2 to set the temperature of the regulated air to 35° C., and use the second humidity regulation module 62 to set the relative humidity of the regulated air to 88%. Control the dry salt spray atmosphere and the regulated air flow ratio to 1:5 with the first air supply device 91 and the second air supply device 92, and introduce them into mixing chamber 3. After mixing evenly in mixing chamber 3, use the third air supply device 93 to introduce the mixed gas into test chamber 4. Real-time monitor the salt spray concentration, temperature, and relative humidity in the test chamber with the salt spray laser monitoring sensor 7, as well as temperature and humidity sensors, and within 10 minutes, the salt spray concentration in test chamber 4 had reached a stable value of 450 mg/m³. The relative humidity remains stable at 80%±1%. Due to the deviation of salt spray concentration from the required concentration for the test, with the feedback adjustment function of the equipment system, a correction coefficient of 0.9 is calculated based on the monitoring results of salt spray concentration. According to formulas 3 and 2, change the relative humidity and flow rate of the regulated air, and continuously iterate feedback adjustments to achieve dynamic equilibrium in test chamber environment.

Embodiment 2

Using the same environmental test equipment as Embodiment 1, with a fixed dry salt spray concentration of 3000 mg/m³ and a relative humidity of 40%. When the environment required by the test is 40° C., the relative humidity is 85%, and the salt spray concentration is 600 mg/m³. According to formulas 1 and 2, the relative humidity of the regulated air should be controlled at 96%, and the ratio of dry salt spray atmosphere flow rate to regulated air flow rate should be 1:4.

When starting the environmental test equipment, the equipment firstly uses the dry salt spray generation system 1 to generate a fixed concentration of 4000 mg/m³ of dry salt spray atmosphere. In the dry salt spray generation system, the temperature is controlled to 40° C. by the first temperature regulation module 51, and the relative humidity is adjusted to 40% by the first humidity regulation module 61. Simultaneously, use the second temperature regulation module 52 of air conditioning system 2 to set the temperature of the regulated air to 40° C., and use the second humidity regulation module 62 to set the relative humidity of the regulated air to 96%. Control the dry salt spray atmosphere and the regulated air flow ratio to 1:4 with the first air supply device 91 and the second air supply device 92, and introduce them into mixing chamber 3. After mixing evenly in mixing chamber 3, use the third air supply device 93 to introduce the mixed gas into test chamber 4. Real-time monitor the salt spray concentration, temperature, and relative humidity in the test chamber with the salt spray laser monitoring sensor 7, as well as temperature and humidity sensors, and within 10 minutes, the salt spray concentration in test chamber 4 had reached a stable value of 530 mg/m³. The relative humidity remains stable at 85%±1%. Due to the deviation of salt spray concentration from the required concentration for the test, with the feedback adjustment function of the equipment system, a correction coefficient of 0.88 is calculated based on the monitoring results of salt spray concentration. According to formulas 3 and 2, change the relative humidity and flow rate of the regulated air, and continuously iterate feedback adjustments to achieve dynamic equilibrium in test chamber environment.

The above embodiments are only the preferred embodiments of the disclosure, but cannot be used as a limitation on the disclosure. Any modifications or improvements made based on the concept of the disclosure should fall within the scope of protection of the disclosure. The specific scope of protection shall be subject to the claims.

What is claimed is:

1. An environmental test equipment for cooperative control of salt spray concentration and relative humidity, comprising a dry salt spray generation system, an air conditioning system, a mixing chamber, a test chamber, and an electrical control cabinet, the dry salt spray generation system is a first chamber comprising a dry spray generator, a first temperature regulation module, and a first humidity regulation module, the dry spray generator grinds salt particles into micron sized dry salt aerosol particles, and adjusts the dry salt spray generation system to a set temperature and relative humidity through the first temperature regulation module and the first humidity regulation module, then the dry salt aerosol particles are introduced into the mixing chamber; the air conditioning system is a second chamber comprising a second temperature regulation module and a second humidity regulation module, used to regulate air inside the air conditioning system to the set temperature and relative humidity, and then the air is introduced into the mixing chamber; the mixing chamber is used to mix the dry salt aerosol particles inside and the introduced regulated air evenly, and then introduce them into the test chamber; the test chamber is used for conducting environmental tests, and is equipped with sensors to monitor the salt spray concentration, the relative humidity, and a temperature; the electric control cabinet is used to control an operation of devices in the dry salt spray generation system, the air conditioning system, the mixing chamber, and the test chamber;

based on a principle of conservation of salt and moisture content before and after the mixing, the environmental test equipment obtains a salt spray concentration relationship and a relative humidity relationship among environmental parameters in the test chamber, dry salt spray environmental parameters in the dry salt spray generation system, and the environmental parameters of the regulated air in the air conditioning system; after determining the environmental test parameters required for the test chamber, obtaining the temperature and relative humidity parameters required for the dry salt spray generation system, as well as the temperature and relative humidity parameters required for the air conditioning system, through the salt spray concentration relationship and the relative humidity relationship.

2. The environmental test equipment for cooperative control of salt spray concentration and relative humidity according to claim 1, wherein the dry salt spray generation system is connected to the mixing chamber through a first air supply device with adjustable flow rate, the air conditioning system is connected to the mixing chamber through a second air supply device with adjustable flow rate, and the mixing chamber is connected to the test chamber through a third air supply device with adjustable flow rate.

3. The environmental test equipment for cooperative control of salt spray concentration and relative humidity according to claim 2, wherein the dry spray generator comprises a connected salt inlet pipe and a grinding chamber, a grinding knife driven by a servo motor is installed in the grinding chamber, and the grinding chamber is equipped with an outlet connected to the first chamber of the dry salt spray generation system, at which a filter screen and a fourth air supply device with adjustable flow rate are installed, and the dry salt aerosol particles formed by grinding are introduced into the first chamber of the dry salt spray generation system through the fourth air supply device.

4. The environmental test equipment for cooperative control of salt spray concentration and relative humidity according to claim 3, wherein a gas flow rate from the mixing chamber to the test chamber is equal to a flow rate from the dry salt spray generation system to the mixing chamber plus a flow rate from the air conditioning system to the mixing chamber, to maintain a pressure inside the mixing chamber.

5. The environmental test equipment for cooperative control of salt spray concentration and relative humidity according to claim 4, wherein the test chamber is equipped with an exhaust device to maintain a pressure inside the test chamber.

6. The environmental test equipment for cooperative control of salt spray concentration and relative humidity according to claim 5, wherein the set temperature in the dry salt spray generation system and the set temperature in the air conditioning system are both a required test environment temperature in the test chamber, after a temperature in the dry salt spray generation system and a temperature in the air conditioning system both reach the set temperature, the dry salt aerosol particles and the regulated air are introduced into the mixing chamber.

7. The environmental test equipment for cooperative control of salt spray concentration and relative humidity according to claim 6, wherein the salt spray concentration relationship and the relative humidity relationship among the environmental parameters in the test chamber, the dry salt spray environmental parameters in the dry salt spray generation system, and the environmental parameters of the regulated air in the air conditioning system are as follows, $$C = \frac{C_1 V_1}{V_1 + V_2}, \tag{1}$$

$$RH = \frac{(V_1 S_1 RH_1 + V_2 S_2 RH_2) + V_1 C_1 (\omega_2 - \omega_1)/\omega_1 \omega_2}{(V_1 + V_2)S}, \tag{2}$$

wherein, C is the salt spray concentration that needs to be controlled in the test chamber; $C_1$ is a NaCl concentration in the dry salt spray atmosphere before mixing, having a unit of $g/m^3$; $V_1$ is a volume of the dry salt spray atmosphere before the mixing; $V_2$ is a volume of the regulated air before the mixing; RH is the relative humidity after the mixing; $S_1$ is a saturated absolute humidity of the dry salt spray atmosphere before the mixing, which is related to temperature and is measured in a unit of $g/m^3$; $S_2$ is a saturated absolute humidity of the regulated air before the mixing, which is related to the temperature and is measured in a unit of $g/m^3$; $RH_1$ is the relative humidity of the dry salt spray atmosphere before the mixing; $RH_2$ is the relative humidity of the regulated air before the mixing; $\omega_1$ is a mass fraction of NaCl in NaCl droplets in the dry salt spray atmosphere before the mixing; $\omega_2$ is a mass fraction of NaCl in NaCl droplets in the salt spray atmosphere after the mixing; S is a saturated absolute humidity of the mixed air after the mixing, which is related to the temperature and is measured in a unit of $g/m^3$.

8. The environmental test equipment for cooperative control of salt spray concentration and relative humidity according to claim 7, wherein the salt spray concentration monitoring values obtained in the test chamber by a salt spray laser monitoring sensor are compared with theoretical values of the salt spray concentration calculated through the salt spray concentration relationship, and a correction coefficient a is obtained based on a ratio of the salt spray concentration monitoring values to the theoretical values of the salt spray concentration, and then obtain the following correction relationship for maintaining the salt spray concentration in the test chamber as described follow, $$C = \alpha \frac{C_1 V_1}{V_1 + V_2};$$ (3)

then, combined with the relative humidity relationship $$RH = \frac{(V_1 S_1 RH_1 + V_2 S_2 RH_2) + V_1 C_1 (\omega_2 - \omega_1)/\omega_1 \omega_2}{(V_1 + V_2)S},$$ (2)

adjust the relative humidity of the air conditioning system and the air flow rate entering the mixing chamber to achieve dynamic equilibrium between the salt spray concentration and the relative humidity in the test chamber.

9. The environmental test equipment for cooperative control of salt spray concentration and relative humidity according to claim 8, wherein during the adjustment process of dynamic equilibrium between the salt spray concentration and the relative humidity in the test chamber, keep a concentration and a relative humidity of the dry salt spray atmosphere entering the mixing chamber constant, and adjust the ratio of the flow rate from the dry salt spray generation system to the mixing chamber and the flow rate from the air conditioning system to the mixing chamber, as well as the relative humidity of the air, to obtain the required testing environment parameters for the test chamber.

\* \* \* \* \*